United States Patent
Hong

(10) Patent No.: US 7,743,213 B2
(45) Date of Patent: Jun. 22, 2010

(54) PORTABLE STORAGE DEVICE WITH NETWORK FUNCTION

(76) Inventor: Shih-Ho Hong, 3F, No. 136, Sec. 2, Keelung Road, Taipei (TW) 106

( * ) Notice: Subject to any disclaimer, the term of this patent is extended or adjusted under 35 U.S.C. 154(b) by 460 days.

(21) Appl. No.: 11/704,444

(22) Filed: Feb. 12, 2007

(65) Prior Publication Data

US 2008/0126681 A1 May 29, 2008

(30) Foreign Application Priority Data

Nov. 24, 2006 (TW) .............................. 95143624 A

(51) Int. Cl.
*G06F 13/14* (2006.01)
(52) U.S. Cl. ...................................... 711/115; 711/103
(58) Field of Classification Search ....................... None
See application file for complete search history.

(56) References Cited

U.S. PATENT DOCUMENTS

| 6,105,119 | A | * | 8/2000 | Kerr et al. ................... 711/219 |
| 7,373,451 | B2 | * | 5/2008 | Lam et al. ....................... 711/6 |
| 2004/0196375 | A1 | * | 10/2004 | Marshall .................. 348/207.1 |
| 2005/0144353 | A1 | * | 6/2005 | Long et al. .................. 711/100 |
| 2005/0251609 | A1 | * | 11/2005 | Chou et al. .................. 710/313 |
| 2007/0061505 | A1 | * | 3/2007 | Deng et al. ................. 711/103 |
| 2007/0124536 | A1 | * | 5/2007 | Carper ....................... 711/115 |
| 2008/0126810 | A1 | * | 5/2008 | Chiu ......................... 713/186 |

* cited by examiner

*Primary Examiner*—Than Nguyen
(74) *Attorney, Agent, or Firm*—Ding Yu Tan

(57) ABSTRACT

A portable storage device with network function includes a network file management system, via which an electronic apparatus coupled to the portable storage device manages the access of files between a memory unit of the portable storage device and a remote network host. Therefore, the portable storage device with network function is more convenient for use.

13 Claims, 3 Drawing Sheets

PORTABLE STORAGE DEVICE WITH NETWORK FUNCTION

FIELD OF THE INVENTION

The present invention relates to a portable storage device with network function, and more particularly to a portable storage device, into which network function is incorporated, so that an electronic apparatus coupled to the portable storage device with network function may manage the access of files between a memory unit of the portable storage device and a remote network host.

BACKGROUND OF THE INVENTION

In most of the currently adopted manners of data processing and data storage, data to be stored is either stored in a personal computer, such as a desktop computer, a notebook computer, or a personal digital assistant (PDA), or in a remote server by linking a personal computer with the remote server via a network. When it is desired to use the disk space in the remote server as a virtual disk of the personal computer, it is necessary to set a relevant driver for the personal computer. Since such setting is computer-specific, a user without carrying that computer about just could not use the virtual network disk drive.

It is therefore tried by the inventor to develop a portable storage device with network function to overcome the limitation in using the conventional portable storage device, so that an electronic apparatus coupled to the portable storage device with network function may manage the access of files between a memory unit of the portable storage device and a remote network host via a network file management system in the device, making the portable storage device more convenient for use.

SUMMARY OF THE INVENTION

A primary object of the present invention is to provide a portable storage device, into which network function is incorporated, so that an electronic apparatus coupled to the portable storage device with network function may manage the access of files between a memory unit of the portable storage device and a remote network host.

For a desktop computer or a hand-held electronic apparatus, such as a notebook computer or a PDA, the portable storage device with network function according to the present invention may be a standard memory card or hard disk but having a storage capacity set via a network file system. Therefore, the portable storage device with network function according to the present invention is compatible with an operating system supporting mass storage without the need of additional drivers, and may have a storage capacity much larger than other currently available portable storage devices.

To achieve the above and other objects, the portable storage device with network function according to the present invention includes an interface unit for coupling to an electronic apparatus; a network unit for linking with a remote network host; a memory unit providing access of data; and a processing unit that receives instructions of the coupled electronic apparatus to control the access of data between the memory unit and the electronic apparatus via the interface unit, and the access of data between the memory unit and the linked remote network host via the network unit.

Therefore, it is possible to access files in a remote network host via the electronic apparatus and a network file management system in the portable storage device, making the portable storage device with network function more convenient for use.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
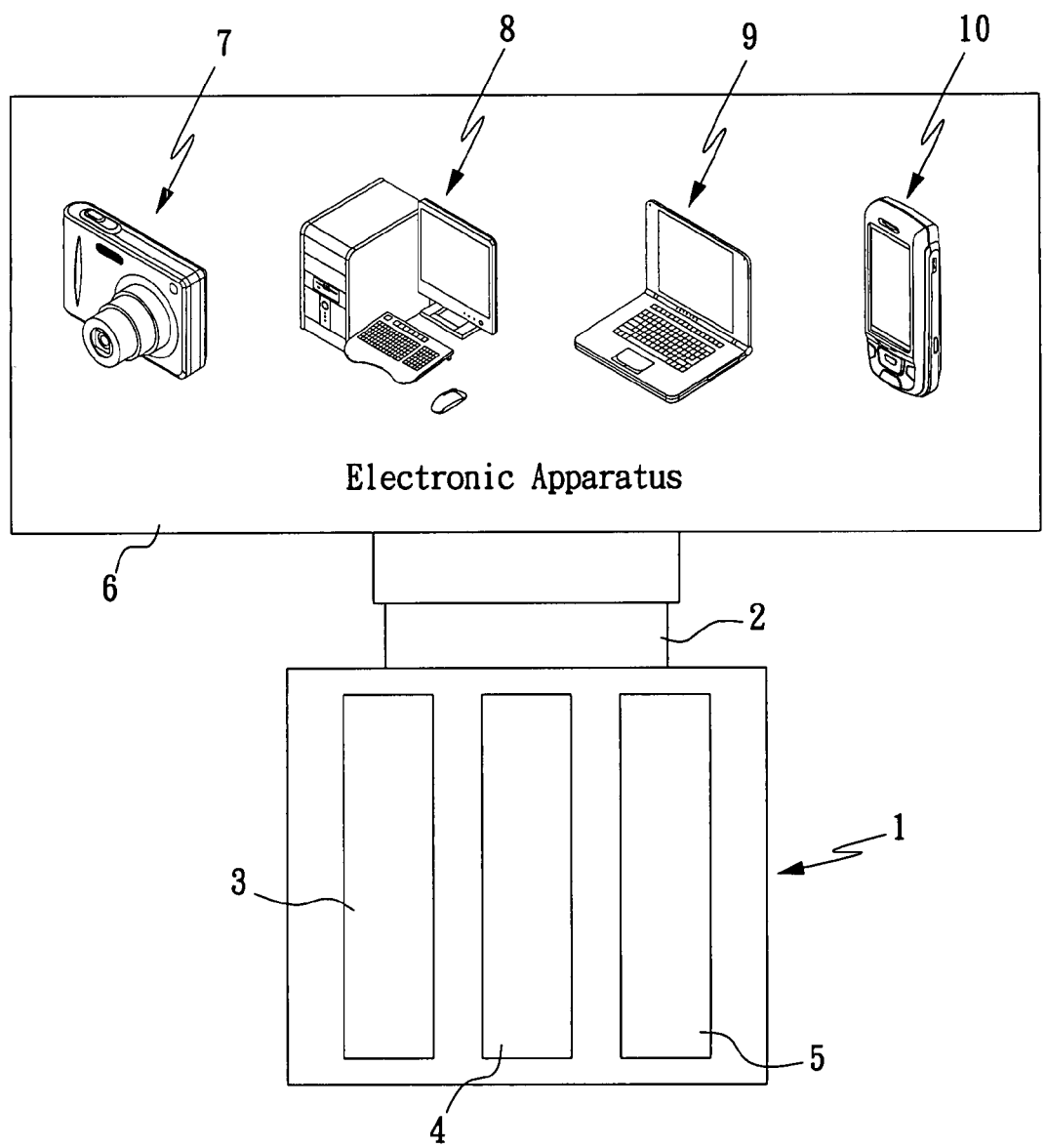
FIG. 1 shows a configuration of a portable storage device with network function according to the present invention.

Please refer to FIG. 1 that shows a configuration of a portable storage device with network function 1 according to the present invention. As shown, the portable storage device with network function 1 includes an interface unit 2, which may include, but not limited to, a universal serial bus (USB) interface, a Secure Digital (SD) interface, a Compact Flash (CF) interface, an xD Picture Card (xD) interface, a Personal Computer Memory Card International Association (PCMCIA) interface, a 1394 interface, an infrared interface, or a Bluetooth interface, for coupling to an electronic apparatus 6, including, but not limited to, a digital camera 7, a desktop computer 8, a notebook computer 9, a PDA 10, an MP3 player (not shown), or a voice pen (not shown); a network unit 3, which may be a wired-network chip or a wireless-network chip, for linking with a remote network host or a virtual hard disk; a memory unit 4 providing access of data; and a processing unit 5, which may include, but not limited to, a SOC (System on chip) configuration.

The memory unit 4 is internally provided with an operating system (not shown), which further includes an interface driving unit (not shown) for driving the interface unit 2, a network driving unit (not shown) for driving the network unit 3, a network file management system (not shown), a system security unit (not shown) for protecting the operating system against computer virus infection, and an authentication unit (not shown) for user authentication by way of password authentication, fingerprint authentication, or voice authentication, etc.

Figure 2:
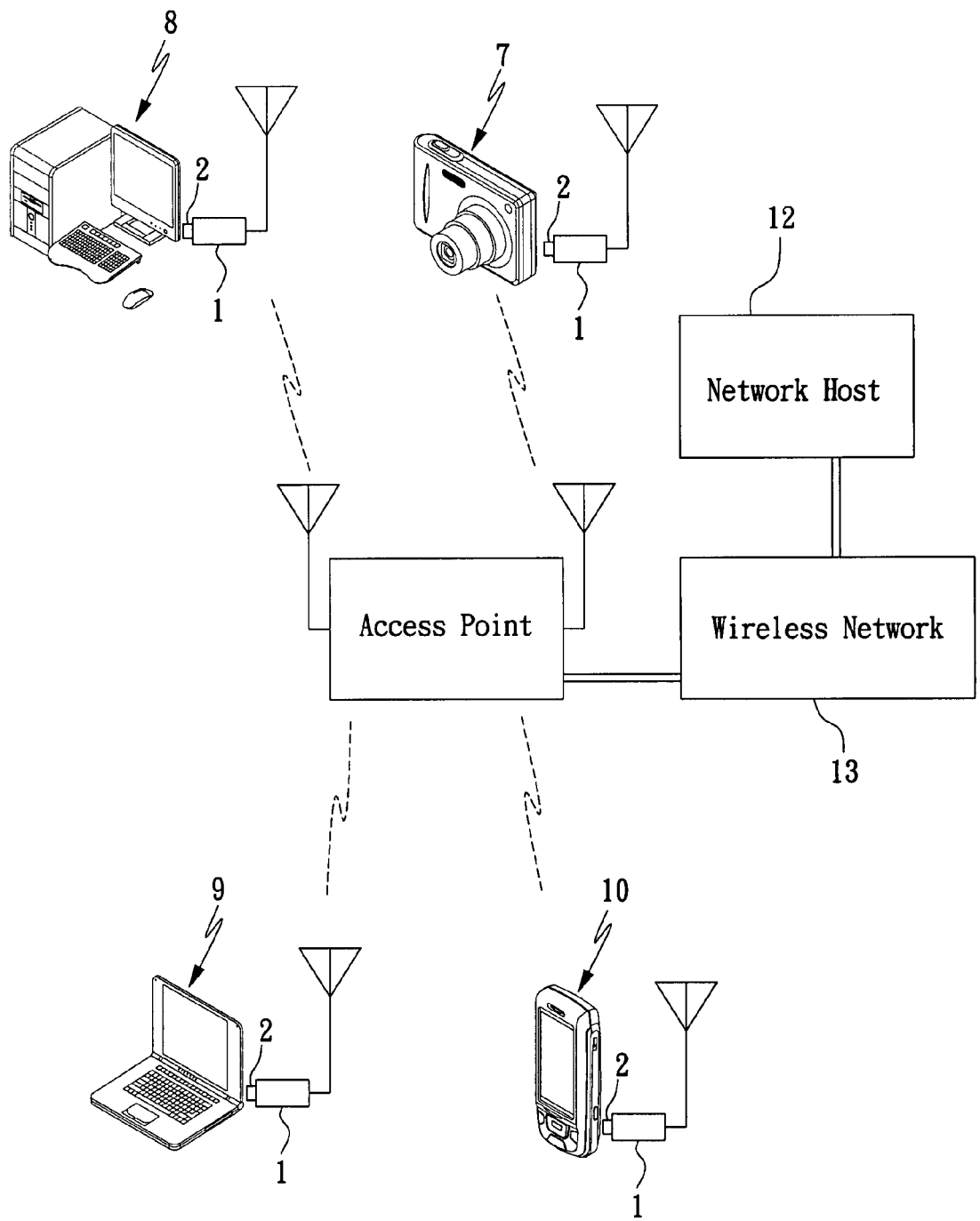
FIG. 2 shows a preferred example of application of the portable storage device with network function according to the present invention in a wireless network system.
Figure 3:
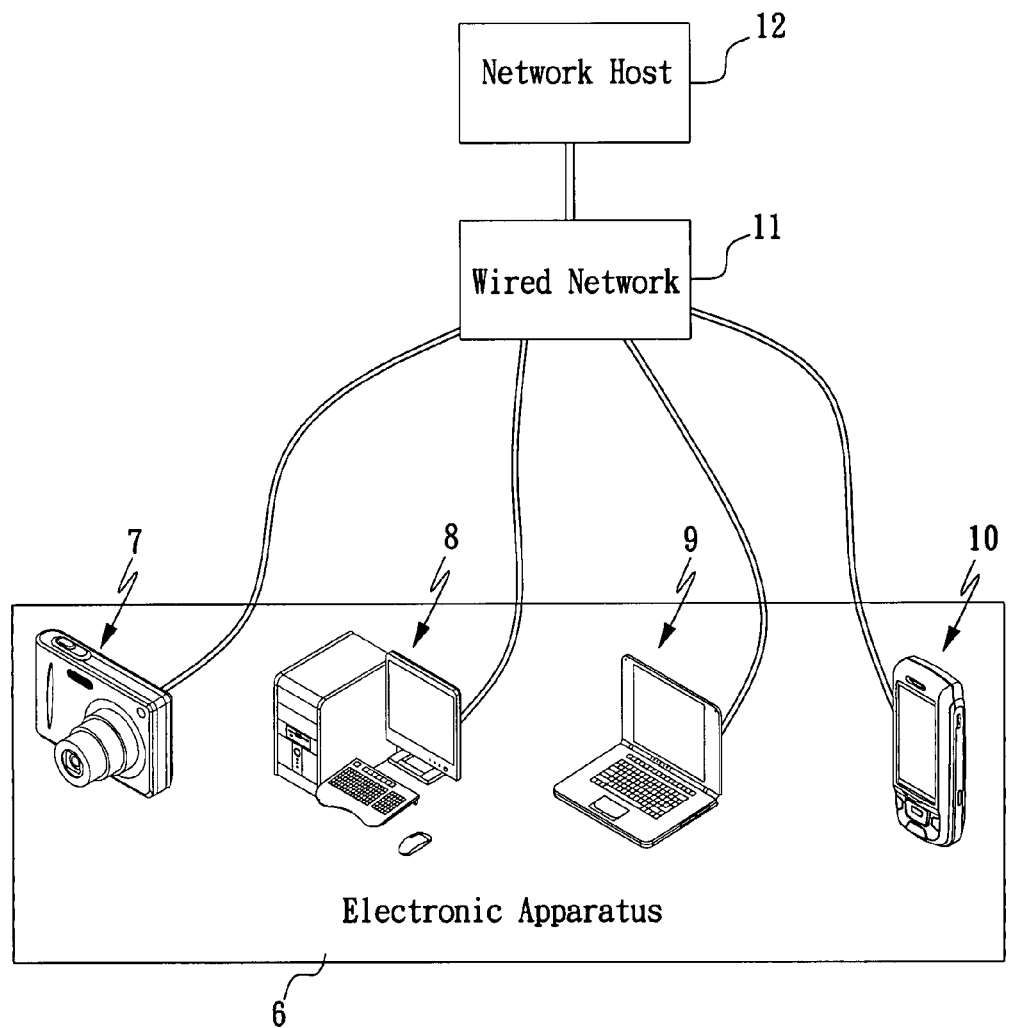
FIG. 3 shows a preferred example of application of the portable storage device with network function according to the present invention in a wired network system.

FIGS. 2 and 3 show preferred examples of application of the portable storage device with network function 1 in a wireless network system and a wired network system, respectively. As shown, the portable storage device with network function 1 is coupled to an electronic apparatus 6, including but not limited to a digital camera 7, a personal computer 8, a notebook computer 9, a PDA 10, an MP3 player, or a voice pen, so that the processing unit 5 in the portable storage device 1 receives instructions from the electronic apparatus 6 for controlling access of data between the memory unit 4 and the electronic apparatus 6, and access of data between the memory unit 4 and a remote network host 12 or a virtual hard disk, which is linked with the portable storage device 1 via a wired network 11 as shown in FIG. 3 or a wireless network 13 as shown in FIG. 2. In the application in the wired network system, data is transmitted via the interface unit 2, and in the application in the wireless network system, data is transmitted via the network unit 3. The electronic apparatus 6 uses the network file management system (not shown) provided in the portable storage device 1 to manage the data access between the memory unit 4 and the electronic apparatus 6 or between the memory unit 4 and the remote network host 12 or the virtual hard disk. In the present invention, the portable storage device with network function 1 may further include the function of an MP2 player or a voice pen.

As an example, the use of the portable storage device with network function 1 with a digital camera 7 is now further described. In an environment with a wireless network, when the digital camera 7 is coupled to the portable storage device with network function 1, photos taken by using the digital camera 7 may be directly stored on the remote network host 12 or the virtual hard disk via the wireless network. Therefore, the available storage capacity of the digital camera 7 may be effectively increased. On the other hand, when the digital camera 7 is used in an environment without any available network, the photos having been taken may be temporarily stored on the portable storage device with network function 1. The photos stored in the portable storage device 1 may be transmitted to and stored on the remote network host 12 or the virtual hard disk as soon as a network environment is available.

As another example, the use of the portable storage device with network function 1 with a general computer is now further described. With the portable storage device with network function 1, computer operation may be executed at any place on any computer or electronic apparatus by coupling the portable storage device 1 to the computer or the electronic apparatus, and computer files may be stored on the remote network host 12 or the virtual hard disk. In this manner, a user need not carry a clumsy notebook computer about, and would not be restricted to a specific computer to use the remote network host 12.

With the above arrangements, the present invention is novel and improved because the use of the network virtual hard disk to replace the hard disk in a computer enables the computer and the hand-held electronic apparatus to break through the limited hard disk storage capacity thereof, and enables a user to conveniently store data on the plug-and-play portable storage device 1 for use at any place on any computer or electronic apparatus or to store files on the hard disk of a remote server without the need of carrying about a clumsy portable electronic apparatus. The present invention also has good industrial applicability because products derived from the present invention would no doubt fulfill the current market demands.

What is claimed is:

1. A portable storage device with network function, comprising:
    an interface unit for coupling to an electronic apparatus;
    a network unit located within the portable storage device for linking with a remote network host;
    a memory unit located within the portable storage device providing access of data and temporarily storing data received from the electronic apparatus; and
    a processing unit located within the portable storage device that receives instructions from the electronic apparatus for controlling access of data between the memory unit and the electronic apparatus with data transmission via the interface unit, and access of data between the memory unit and a remote network host with data transmission via the network unit, wherein data is directly stored on the remote network host;
    wherein the portable storage device with network function is removably coupled to said electronic apparatus, expanding storage capacity of the electronic apparatus.

2. The portable storage device with network function as claimed in claim 1, wherein the memory unit has an operating system stored therein.

3. The portable storage device with network function as claimed in claim 2, wherein the operating system includes a network driving unit for driving the network unit.

4. The portable storage device with network function as claimed in claim 2, wherein the operating system includes an interface driving unit for driving the interface unit.

5. The portable storage device with network function as claimed in claim 2, wherein the operating system includes a network file management system, via which the electronic apparatus manages the access of data between the memory unit and the electronic apparatus, and between the memory unit and the remote network host.

6. The portable storage device with network function as claimed in claim 2, wherein the operating system includes a system security unit for protecting the operating system against computer virus infection.

7. The portable storage device with network function as claimed in claim 2, wherein the operating system includes an authentication unit for authenticating at least one user.

8. The portable storage device with network function as claimed in claim 1, wherein the interface unit is selected from the group consisting of a USB interface, an SD interface, a CF interface, an XD interface, a PCMCIA interface, a 1394 interface, an infrared interface, and a Bluetooth interface.

9. The portable storage device with network function as claimed in claim 1, wherein the electronic apparatus is selected from the group consisting of a digital camera, a personal computer, a notebook computer, and a PDA.

10. The portable storage device with network function as claimed in claim 1, wherein the network unit is selected from the group consisting of a wired network chip and a wireless network chip.

11. The portable storage device with network function as claimed in claim 1, wherein the processing unit comprises a SOC (System on chip) configuration.

12. The portable storage device with network function as claimed in claim 7, wherein the authentication unit conducts authentication in a manner selected from the group consisting of password authentication, fingerprint authentication, and voice authentication.

13. The portable storage device with network function as claimed in claim 1, further comprising an MP3 player or a voice pen.

* * * * *